(12) United States Patent
Valente

(10) Patent No.: US 10,072,923 B2
(45) Date of Patent: Sep. 11, 2018

(54) METHOD FOR PROCESSING SIGNALS ORIGINATING FROM ONE OR MORE SENSORS, IN PARTICULAR PROXIMITY SENSORS, FOR THE RECOGNITION OF A MOVEMENT OF AN OBJECT AND CORRESPONDING DEVICE

(71) Applicant: STMicroelectronics SA, Montouge (FR)

(72) Inventor: Stéphane Valente, Paris (FR)

(73) Assignee: STMICROELECTRONICS SA, Montrouge (FR)

( * ) Notice: Subject to any disclaimer, the term of this patent is extended or adjusted under 35 U.S.C. 154(b) by 399 days.

(21) Appl. No.: 14/661,907

(22) Filed: Mar. 18, 2015

(65) Prior Publication Data

US 2016/0033260 A1    Feb. 4, 2016

(30) Foreign Application Priority Data

Jul. 30, 2014    (FR) ..................... 14 57375

(51) Int. Cl.
| | |
|---|---|
| *G01C 9/00* | (2006.01) |
| *G01B 11/14* | (2006.01) |
| *G01S 17/08* | (2006.01) |
| *G06N 7/00* | (2006.01) |
| *G06F 3/042* | (2006.01) |
| *G06F 3/01* | (2006.01) |
| *G06F 3/03* | (2006.01) |

(52) U.S. Cl.
CPC .............. *G01B 11/14* (2013.01); *G01S 17/08* (2013.01); *G06F 3/017* (2013.01); *G06F 3/0304* (2013.01); *G06F 3/042* (2013.01); *G06N 7/005* (2013.01)

(58) Field of Classification Search
CPC ........ H04N 19/70; H04N 19/44; H04N 19/61; H04N 19/176; H04N 19/21; H04N 19/51; H04N 19/59; H04N 19/16; H04N 19/46; H04N 19/895; H04N 19/17; H04N 19/172; H04N 19/507; H04N 19/97; H04N 19/00
See application file for complete search history.

(56) References Cited

PUBLICATIONS

Berndt et al., "Using Dynamic Time Warping to Find Patterns in Time Series," *AAAI-94 Workshop on Knowledge Discovery in Databases*, KDD-94, pp. 359-370, 1994.

(Continued)

*Primary Examiner* — Robert Bachner
(74) *Attorney, Agent, or Firm* — Seed IP Law Group LLP

(57) ABSTRACT

The method for processing signals originating for example from several proximity sensors for the recognition of a movement of an object, comprises first respective samplings of the said signals delivered by the sensors so as to obtain a first set of first date-stamped samples, the generation, from the first set of first date-stamped samples, of new sampling times comprising a start of movement time, an end of movement time, and times regularly spaced between the start of movement time and the end of movement time, a re-sampling of the signal delivered by each sensor between the start of movement time and the end of movement time at the said new sampling times using the first samples, in such a manner as to generate a second set of second date-stamped samples, and a processing of the said second set of date-stamped samples by a movement recognition algorithm.

30 Claims, 6 Drawing Sheets

(56) References Cited

PUBLICATIONS

Burges, "A Tutorial on Support Vector Machines for Pattern Recognition," *Data Mining and Knowledge Discovery* 2:121-167, 1998.
Rish, "An empirical study of the naïve Bayes classifier," *IJCAI 2001 workshop on empirical methods in artificial intelligence* 3(22):41-46, 2001.

METHOD FOR PROCESSING SIGNALS ORIGINATING FROM ONE OR MORE SENSORS, IN PARTICULAR PROXIMITY SENSORS, FOR THE RECOGNITION OF A MOVEMENT OF AN OBJECT AND CORRESPONDING DEVICE

BACKGROUND

Technical Field

Various embodiments relate to the processing of signals originating from at least one sensor, in particular but not exclusively proximity sensors, for the recognition of a movement of an object, for example a hand movement made above a tablet, a cellular mobile telephone or other similar electronic device, and with which an action is associated.

Description of the Related Art

Proximity sensors are sensors capable of detecting the presence of a nearby object without any physical contact. These sensors are known to those skilled in the art. The proximity sensors marketed by STMicroelectronics under the reference VL6180X may for example be used.

These sensors emit an infrared beam in the direction of an object and measure the time-of-flight (TOF technology) of this beam, in other words the time taken between its emission and its reception by the sensor after reflection on the object.

They can supply several pieces of information, notably information relating to the distance between the sensor and the object, the amplitude of the signal received by the sensor, the coverage of the object, in other words the percentage of the surface of the emission cone covered by the object, or else the convergence time of the sensor, in other words the time needed by the sensor for determining the time-of-flight of the emitted beam. This convergence time depends, in part, on the distance that separates the object from the sensor.

When no object is detected, these data have a value equal to a reference value. The latter differs depending on the type of information and corresponds, for example for the distance information, to the maximum detection distance of the sensor.

The problem of recognition of a movement of an object, and notably of a hand movement, may be seen as a problem of classification or of recognition of shapes.

There exist numerous algorithms for classification and for recognition of shapes amongst which may be mentioned:

support vector machines (or SVMs), described in the article "A Tutorial on Support Vector Machines for Pattern Recognition", C. J. C. Burges, in Data Mining and Knowledge Discovery 2, pp. 121-167, 1998;

naïve Bayes classification, described for example in "An empirical study of the naïve Bayes classifier", I. Rish, IJCAI 2001 Workshop on Empirical Methods in Artificial Intelligence, 2001; and dynamic time warping (or DTW), described in "Using Dynamic Time Warping to Find Patterns in Time Series", D. J. Benrdt, AAA1-94 Workshop on Knowledge Discovery in Databases, pp. 359-370, 1994.

Support vector machines and Bayes classification require vectors of a fixed size (whose number of components does not vary) at the input, whereas dynamic time warping can operate with vectors of variable size.

BRIEF SUMMARY

In the problem of recognition of hand movements, since the hand movements performed by a person are dynamic, with a variable speed and not having a fixed duration, the size of the vector containing the date-stamped sample corresponding to the signals delivered by the various proximity sensors varies from one hand movement to another. It is therefore in principle necessary to use shape-recognition algorithms such as dynamic time warping that can work with vectors of variable size. However, these algorithms are much more complex than the algorithms using vectors of fixed size at the input.

Another problem in the recognition of hand movements comes from the fact that a proximity sensor does not supply information at regular time intervals. Moreover, when a system for recognition of hand movements uses more than one proximity sensor, the latter are not synchronized with one another. The vector containing the date-stamped sample corresponding to the signals delivered by the various sensors will not therefore in fact be able to be used at the input of any shape-recognition algorithm even if the latter works with vectors of variable size.

According to one embodiment, hand movements are recognized using one or more sensors, for example proximity sensors, and a shape-recognition algorithm.

According to one embodiment, a method processes signals originating from at least one sensor, for example a proximity sensor, and potentially from several sensors, for the recognition of a movement of an object, for example a hand movement, comprising: a first sampling of each signal delivered by each sensor so as to obtain a first set of first date-stamped samples, the generation, based on the first set of first date-stamped samples, of new sampling times comprising a start of movement time, an end of movement time, and times regularly spaced between the start of movement time and the end of movement time, and a re-sampling of the signal delivered by each sensor between the start of movement time and the end of movement time at the said new sampling times using the first samples, in such a manner as to generate a second set of second date-stamped samples.

According to one embodiment, the method furthermore comprises a processing of the said second set of date-stamped samples by a movement recognition algorithm.

In an embodiment, a vector of fixed size is obtained containing signals sampled at regular time intervals and, when several sensors are used, synchronized between the sensors, which facilitates using a relatively simple classification algorithm such as the support vector machines algorithm, for the recognition of a movement of an object.

According to an embodiment, each signal delivered by a sensor contains at least one piece of information relating to the said movement detection, for example the distance between the sensor and the object, and for each sensor, the re-sampling of the signal delivered by this sensor comprises, for each new sampling time and for each piece of information, the generation of the value of the said information based at least on the value of this information contained in a first sample of this signal the closest in time to the said new sampling time.

According to an embodiment, the said at least one piece of information contained in a first date-stamped sample associated with a sensor has a reference value representative of a non-detection of movement by the said sensor, and the said start of movement time is determined as the moment at which at least a first sample of the first set has a value different from the said reference value, and the said end of movement time is determined as the moment at which all the first samples of the first set have a value equal to the said reference value for a reference duration.

If each signal delivered by a sensor contains only one piece of information, this information is, for example, the distance separating the object from the sensor.

If each signal delivered by a sensor contains several pieces of information relating to the said movement detection, the latter are for example chosen within the group formed by the distance separating the object from the sensor, the amplitude of the signal received by the sensor, the coverage of the object and the convergence time of the sensor.

According to an embodiment, in the presence of two closest first samples before and after the said new sampling time, the generation of the value of each piece of information comprises an interpolation between the values of this information contained in the said two closest first samples.

According to an embodiment, in the presence of a closest first sample preceding (respectively following) in time the said new sampling time and in the absence of a closest first sample following (respectively preceding) in time the said new sampling time, the generation of the value of the said at least one piece of information comprises a copy of the value of the said closest first sample preceding (respectively following) in time the said new sampling time.

According to an embodiment, the method furthermore comprises, prior to the step for re-sampling the signals, for each sensor and for each piece of information, the inclusion of a additional first sample at a preceding moment in time with a chosen duration, the first sample containing the first value of this information that differs from the said reference value, and the inclusion of a supplementary first sample at a following moment in time with this same chosen duration, the first sample containing the last value of this information that differs from the said reference value, the value of the additional first sample and of the supplementary first sample being equal to the said reference value.

This embodiment may facilitate a second set of second date-stamped samples to be obtained having a more regular variation at the start and at the end of the movement.

According to an embodiment, a device for recognition of a movement of an object is provided, comprising an interface configured for receiving a first set of first date-stamped samples of signals delivered by at least one sensor, at least one processing device configured to generate, from the first set of first date-stamped samples, new sampling times comprising a start of movement time, an end of movement time, and times regularly spaced between the start of movement time and the end of movement time, re-sampling the signal delivered by each sensor between the start of movement time and the end of movement time at the said new sampling times using the first samples, in such a manner as to generate a second set of second date-stamped samples.

According to an embodiment, the at least one processing device is configured to process the second set of date-stamped samples by a movement recognition algorithm.

According to an embodiment, each signal delivered by a sensor contains at least one piece of information relating to the said movement detection, and the at least one processing device is configured to, when the signal delivered by each sensor is re-sampled, generate, for each new sampling time and for each piece of information, the value of the said information based at least on the value of this information contained in a first sample of this signal the closest in time to the said new sampling time.

According to an embodiment, the said at least one piece of information contained in a first date-stamped sample associated with a sensor has a reference value representative of a non-detection of movement by the said sensor, and the at least one processing device is configured to determine the said start of movement time as the moment at which at least a first sample of the first set has a value different from the said reference value, and the said end of movement time as the time at which all the first samples of the first set have a value equal to the said reference value for a reference duration.

According to an embodiment, the at least one processing device is configured to, in the presence of two closest first samples before and after the said new sampling time, generate the value of each piece of information by interpolating between the values of this information contained in the said two closest first samples.

According to one embodiment, the at least one processing device is configured to, in the presence of a closest first sample preceding, respectively following, in time the said new sampling time and in the absence of a closest first sample following, respectively preceding, in time the said new sampling time, copy the value of the said closest first sample preceding, respectively following, in time the said new sampling time, in order to generate the value of the said at least one piece of information.

According to an embodiment, the at least one processing device is configured to, prior to the step for re-sampling the signals, for each sensor and for each piece of information, add an additional first sample at a preceding moment in time with a chosen duration, the first sample containing the first value of this information that differs from the said reference value, and add a supplementary first sample at a following moment in time with this same chosen duration, the first sample containing the last value of this information that differs from the said reference value, the value of the additional first sample and of the supplementary first sample being equal to the said reference value.

In an embodiment, a method comprises: generating a first set of time-stamped samples based on at least one signal from at least one sensor; determining a movement-time interval based on the first set of time-stamped samples; determining a plurality of sampling times of the movement-time interval; generating a second set of time-stamped samples based on the determined plurality of sampling times and the first set of time-stamped samples; and generating an indication of movement of an object based on the second set of time-stamped samples. In an embodiment, the generating the indication of movement of the object comprises generating a vector of a fixed size based on the second set of time-stamped samples and applying a motion recognition algorithm using the fixed vector. In an embodiment, the first set of time-stamped samples include movement information and generating a sample of the second set of time-stamped samples associated with a respective sensor of the at least one sensor includes generating movement information of the sample of the second set of time-stamped samples based on movement information of a sample of the first set of time-stamped samples associated with the respective sensor and having a time-stamp closest in time to a sampling time of the sample of the second set of time-stamped samples. In an embodiment, the first set of time-stamped samples include movement information and determining the movement-time interval based on the first set of time-stamped samples comprises: determining a start of the movement-time interval based on an earliest time-stamp of a sample of the first set of time-stamped samples having a value different from a reference value representative of non-detection of movement; and determining an end of the movement-time interval based on a time at which all of the samples of the first set of time-stamped samples have had a value equal to the reference value for a threshold time-period. In an embodiment, the movement information comprises an indication of a distance separating the object from the at least one sensor. In an embodiment, the first set of time-stamped samples include additional information from the at least one sensor. In an embodiment, the at least one signal from at least one sensor provides at least one of: an indication of a distance separating the object from the sensor; an indication of an amplitude of a signal received by the sensor; an indication of a coverage of the object; and a convergence time of the sensor. In an embodiment, at least one sample of the samples of the second set of time-stamped samples is generated by interpolating between: a value associated with a sample of the first set of time-stamped samples associated with a respective sensor and having an earlier time-stamp value than a time-stamp value of the sample of the second set of time-stamped samples; and a value associated with a sample of the first set of time-stamped samples associated with the respective sensor and having a later time-stamp value than the time-stamp value of the sample of the second set of time-stamped samples. In an embodiment, generating a sample of the second set of time-stamped samples comprises associating a value associated with a closest sample of the first set of time-stamped samples and a respective sensor with the sample of the second set of time-stamped samples. In an embodiment, generating the second set of time-stamped samples comprises generating a sample associated with a respective sensor by interpolating between: a value associated with a sample of the first set of time-stamped samples associated with the respective sensor and having a time-stamp value closest to a time-stamp value of the generated sample; and a reference value associated with a sample added to the first set of time-stamped samples, the sample added to the first set of time-stamped samples having a time-stamp value based on the time-stamp value of the generated sample and a reference time-difference value. In an embodiment, the first set of time-stamped samples is generated based on a plurality of signals from a plurality of sensors. In an embodiment, the at least one sensor is a proximity sensor.

In an embodiment, a device comprises: at least one input configured to receive a first set of time-stamped samples indicative of movement of an object; and processing circuitry configured to: determine a movement-time interval based on the first set of time-stamped samples; determine a plurality of sampling times of the movement-time interval; generate a second set of time-stamped samples based on the determined plurality of sampling times and the first set of time-stamped samples; and generate, based on the second set of time-stamped samples, a fixed-size vector indicative of movement of the object. In an embodiment, the processing circuitry comprises at least one processor configured to apply a motion recognition algorithm using the fixed-size vector. In an embodiment, the first set of time-stamped samples are received from at least one sensor and the processing circuitry is configured generate a sample of the second set of time-stamped samples associated with a respective sensor by generating movement information of the sample of the second set of time-stamped samples based on movement information of a sample of the first set of time-stamped samples associated with the respective sensor and having a time-stamp closest in time to a sampling time of the sample of the second set of time-stamped samples. In an embodiment, the first set of time-stamped samples are received from at least one sensor and the processing circuitry is configured to determine the movement-time interval by: determining a start of the movement-time interval based on an earliest time-stamp of a sample of the first set of time-stamped samples having a value different from a reference value representative of non-detection of movement; and determining an end of the movement-time interval based on a time at which all of the samples of the first set of time-stamped samples have had a value equal to the reference value for a threshold time-period. In an embodiment, each sample of the first set of time-stamped samples includes at least one of: an indication of a distance separating the object from a sensor; an indication of an amplitude of a signal received by the sensor; an indication of a coverage of the object; and a convergence time of the sensor. In an embodiment, the processing circuitry is configured to generate at least one sample of the samples of the second set of time-stamped samples by interpolating between: a value associated with a sample of the first set of time-stamped samples having an earlier time-stamp value than a time-stamp value of the sample of the second set of time-stamped samples; and a value associated with a sample of the first set of time-stamped samples having a later time-stamp value than the time-stamp value of the sample of the second set of time-stamped samples. In an embodiment, the first set of time-stamped samples are received from a plurality of sensors and the processing circuitry is configured to generate at least one sample of the samples of the second set of time-stamped samples by interpolating between: a value associated with a sample of the first set of time-stamped samples associated with a first sensor of the plurality of sensors and having an earlier time-stamp value than a time-stamp value of the sample of the second set of time-stamped samples; and a value associated with a sample of the first set of time-stamped samples associated with the first sensor of the plurality of sensors and having a later time-stamp value than the time-stamp value of the sample of the second set of time-stamped samples. In an embodiment, the processing circuitry is configured to generate at least one sample of the second set of time-stamped samples by associating a value associated with a closest sample of the first set of time-stamped samples and a respective sensor of the plurality of sensors with the sample of the second set of time-stamped samples. In an embodiment, the processing circuitry is configured to generate at least one sample of the second set of time-stamped samples associated with a respective sensor by interpolating between: a value associated with a sample of the first set of time-stamped samples associated with the respective sensor and having a time-stamp value closest to a time-stamp value of the generated sample; and a reference value associated with a sample added to the first set of time-stamped samples, the sample added to the first set of time-stamped samples having a time-stamp value based on the time-stamp value of the generated sample and a reference time-difference value.

In an embodiment, a system comprises: a plurality of sensors configured to generate a first set of time-stamped samples indicative of movement of an object; and processing circuitry configured to: determine a movement-time interval based on the first set of time-stamped samples; determine a plurality of sampling times of the movement-time interval; generate a second set of time-stamped samples based on the determined plurality of sampling times and the first set of time-stamped samples; and generate, based on the second set of time-stamped samples, a fixed-size vector indicative of movement of the object. In an embodiment, the processing circuitry is configured to apply a motion recognition algorithm using the fixed-size vector. In an embodiment, the processing circuitry is configured generate a sample of the second set of time-stamped samples associated with a respective sensor by generating movement information of the sample of the second set of time-stamped samples based on movement information of a sample of the first set of time-stamped samples associated with the respective sensor and having a time-stamp closest in time to a sampling time of the sample of the second set of time-stamped samples. In an embodiment, the processing circuitry is configured to determine the movement-time interval by: determining a start of the movement-time interval based on an earliest time-stamp of a sample of the first set of time-stamped samples having a value different from a reference value representative of non-detection of movement; and determining an end of the movement-time interval based on a time at which all of the samples of the first set of time-stamped samples have had a value equal to the reference value for a threshold time-period. In an embodiment, the plurality of sensors are configured to generate time-stamped samples including at least one of: an indication of a distance separating the object from a respective sensor; an indication of an amplitude of a signal received by the respective sensor; an indication of a coverage of the object; and a convergence time of the respective sensor. In an embodiment, the processing circuitry is configured to generate at least one sample of the samples of the second set of time-stamped samples by interpolating between: a value associated with a sample of the first set of time-stamped samples having an earlier time-stamp value than a time-stamp value of the sample of the second set of time-stamped samples; and a value associated with a sample of the first set of time-stamped samples having a later time-stamp value than the time-stamp value of the sample of the second set of time-stamped samples. In an embodiment, the processing circuitry is configured to generate at least one sample of the second set of time-stamped samples by associating a value associated with a closest sample of the first set of time-stamped samples and a respective sensor of the plurality of sensors with the sample of the second set of time-stamped samples.

In an embodiment, a non-transitory computer-readable medium's contents configure at least one processing device to perform a method, the method comprising: determining a movement-time interval based on a first set of time-stamped samples generated by a plurality of sensors; determining a plurality of sampling times of the movement-time interval; generating a second set of time-stamped samples based on the determined plurality of sampling times and the first set of time-stamped samples; and generating an indication of movement of an object based on the second set of time-stamped samples. In an embodiment, the method comprises generating a fixed-size vector based on the second set of time stamped samples and applying a motion recognition algorithm using the fixed-size vector. In an embodiment, the method comprises generating at least one sample of the samples of the second set of time-stamped samples by interpolating between: a value associated with a sample of the first set of time-stamped samples having an earlier time-stamp value than a time-stamp value of the sample of the second set of time-stamped samples; and a value associated with a sample of the first set of time-stamped samples having a later time-stamp value than the time-stamp value of the sample of the second set of time-stamped samples.

According to an embodiment, a device is provided, for example of the digital tablet or cellular mobile telephone type, incorporating a device such as disclosed hereinbefore.

DETAILED DESCRIPTION

Figure 1:
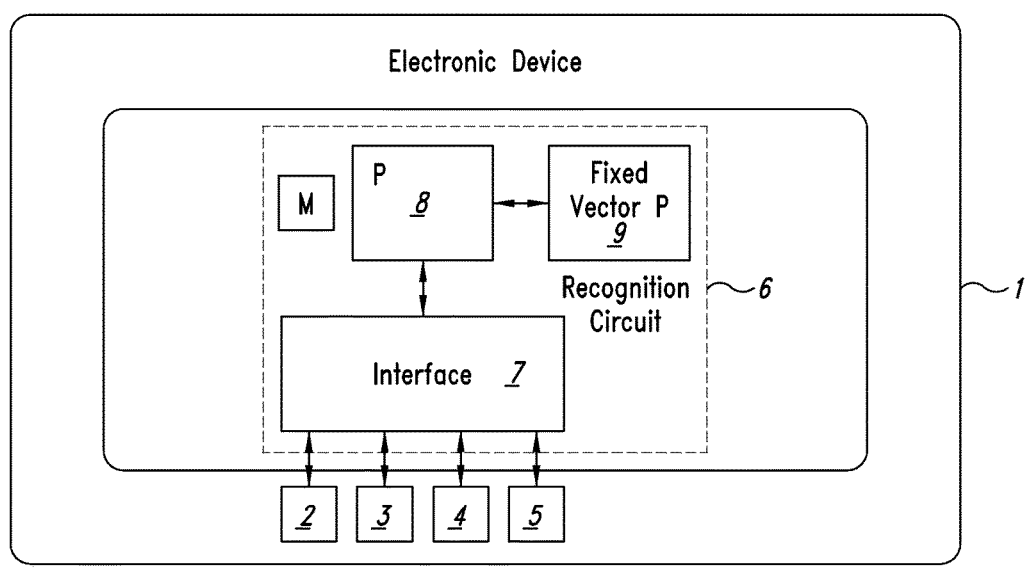
FIG. 1 schematically illustrates an embodiment of a device.

In FIG. 1, the reference 1 denotes an electronic device, for example a tablet or a smartphone, comprising proximity sensors 2, 3, 4 and 5, together with a circuit 6 to recognize a movement of an object, for example the movement of the hand of a user, configured to receive and process the signals delivered by the proximity sensors. This device 6 comprises an interface 7 communicating, on the one hand, with the sensors and, on the other, with a first processor 8, implemented for example as software within a microcontroller. The microcontroller 8 itself communicates with a second processor 9, implemented for example as software within a microcontroller and incorporating a movement recognition algorithm operating on input vectors of fixed size. Examples of such an algorithm of operating on input vectors of a fixed size are conventional and known per se. Although the first processor 8 and the second processor 9 are illustrated as separate processors P, in an embodiment the first and second processors may be combined. For example, a single processor may be configured to provide the functionality of the first processor 8 and the second processor 9, for example by executing software instructions stored in a memory M. Discrete circuitry may be employed.

The number of proximity sensors here is equal to four, but a different number of sensors could be chosen, where the latter may be equal to one.

Furthermore, although here proximity sensors are used, it would be possible to use other types of sensors, such as thermal, infrared, or other types of sensors.

The proximity sensors 2, 3, 4 and 5 deliver signals which are sampled at non-regular intervals of time and which are not synchronized with one another, thus forming a first set of first time-stamped samples.

Each first sample carries information contained in the signal delivered by a sensor. In theory, the signal delivered by a sensor may only comprise a single piece of information, for example the distance between the sensor and the object. Nevertheless, in practice, the signal may contain other information such as the amplitude of the signal received by the sensor, the coverage of the object and/or the convergence time of the sensor.

In the following part of the text, for the sake of simplification and unless otherwise indicated, each first sample corresponds to the information on distance between the sensor and the object whose movement it is desired to recognize. It goes without saying that other first samples corresponding to other types of information may be processed where appropriate.

The processing operations act on the first samples corresponding to the distance information and described hereinafter, are also applied, where appropriate, to the other first samples corresponding to other types of information.

Figure 2:
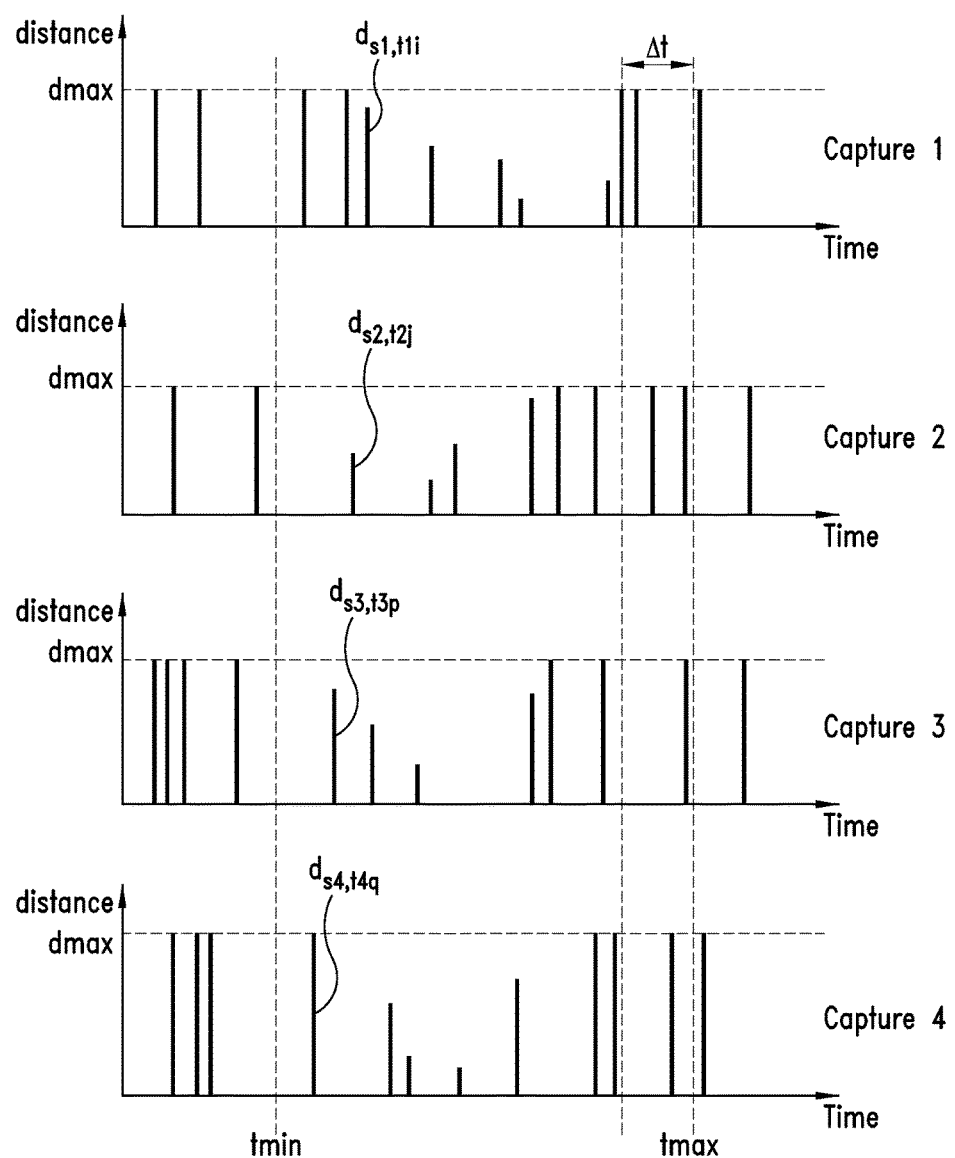
FIG. 2 illustrates example time-stamped samples according to an embodiment.

One example of a first set of first time-stamped samples is illustrated in FIG. 2 for the case where four sensors are considered. In this Figure, $d_{s1,t1i}$, $d_{s2,t2j}$, $d_{s3,t3p}$ and $d_{s4,t4q}$ represent respectively, the sample corresponding to the distance between the sensor 1 and the object whose movement it is desired to recognize at the time t1$i$, the sample corresponding to the distance between the sensor 2 and the object at the time t2$j$, the sample corresponding to the distance between the sensor 3 and the object at the time t3$p$, and the sample corresponding to the distance between the sensor 4 and the object at the time t4$q$.

Figure 3:
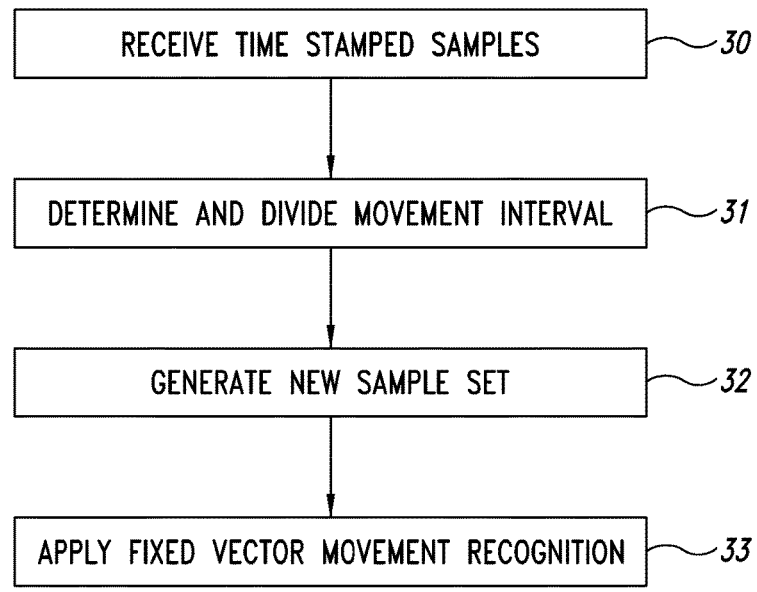
FIG. 3 illustrates an embodiment of a method of processing time-stamped samples.

The first set of first samples thus formed undergoes a processing comprising four steps illustrated in FIG. 3.

In a first step 30, this first set of first samples is received by the interface 7.

New, regularly spaced, sampling times between a start time of the movement tmin and an end time of the movement tmax are subsequently generated by the microcontroller 8 during the second step 31.

The start of movement time tmin may be determined as the moment at which the value of the distance for at least a first sample of the first set is different from the value dmax, this value corresponding to the maximum detection distance of the sensors (typically 20 centimeters), and hence to the reference value representative of a non-detection of movement when the distance is taken into account.

With regard to the end of movement time tmax, it may be determined as the moment at which the value of the distance over all the sensors is equal to dmax for a chosen reference duration Δt, typically 300 milliseconds (FIG. 2).

Once the start time of the movement tmin and the end time of the movement tmax have been determined, the interval [tmin, tmax] is divided into a fixed number N of intervals so as to obtain new regularly spaced sampling times ti (i=0, ..., N).

Generation of new samples, or re-sampling, based on the signals delivered by the sensors is subsequently carried out (step 32) at these new sampling times, in such a manner as to obtain a second set of second date-stamped samples that form a vector of fixed size.

Then, this second set is processed by the movement recognition algorithm in the microprocessor 9 (step 33).

Figure 4:
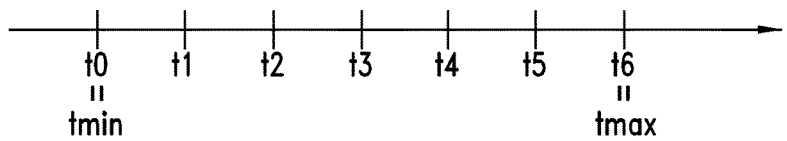
FIG. 4 illustrates an embodiment of a time-interval.

In FIG. 4, the interval [tmin, tmax] is divided for example into N=6 regular intervals. The new regularly spaced times ti (i=0, ..., 6) are thus obtained, t0 being equal the start time of the movement tmin and t6 to the end time of the movement tmax.

As indicated hereinbefore, the signal delivered by each sensor between the start time of the movement tmin and the end time of the movement tmax is subsequently re-sampled for each piece of information by the microcontroller 8 at the new sampling times ti thus obtained, using the first samples, in such a manner as to obtain the second set of second date-stamped samples.

Figure 5:
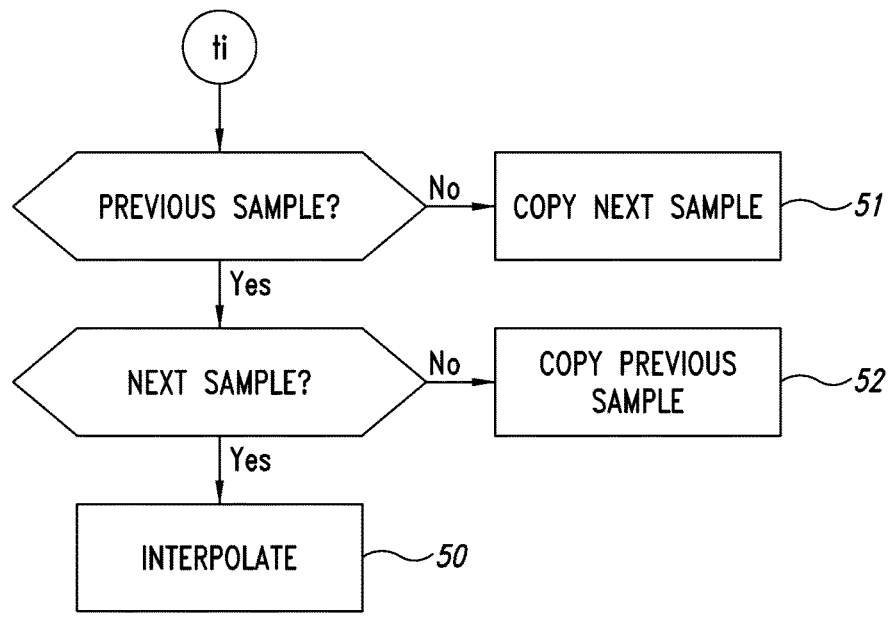
FIG. 5 illustrates an embodiment of a method.
Figure 6A:
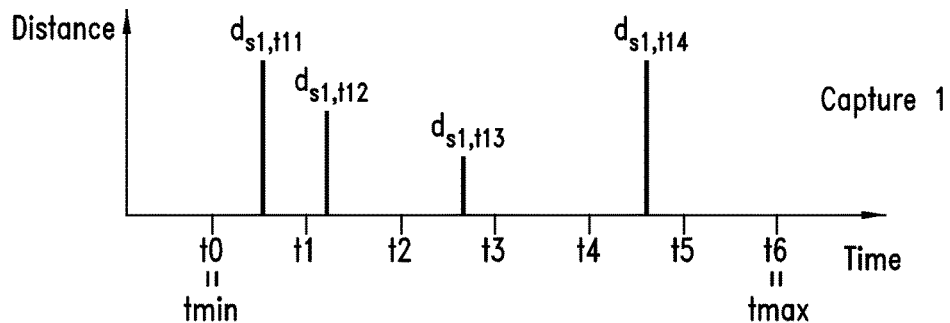
FIGS. 6A, 6B, 7A and 7B illustrate embodiments of time-stamped samples distributed in time.
Figure 6B:
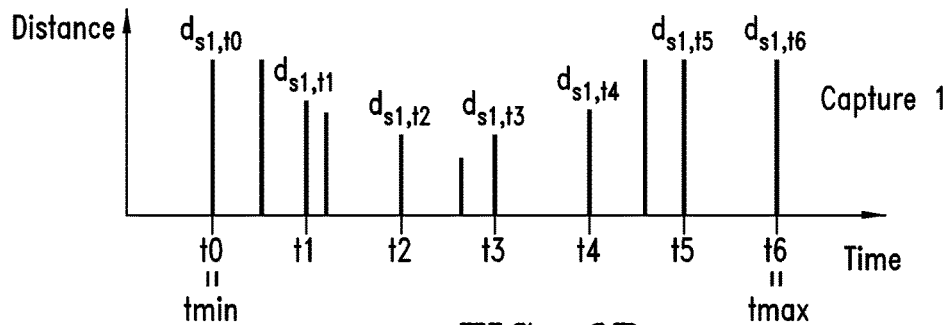

The principle of re-sampling is first of all illustrated in a general way in FIG. 5, then on one example in FIGS. 6A and 6B.

In the presence of a first sample preceding in time the new sampling time ti and in the presence of a first sample following in time the new sampling time ti, for each sensor, the value of each piece of information at the time ti is obtained by interpolation 50 between the value of this information contained in the closest first sample preceding in time the new sampling time ti and the value of this information contained in the closest first sample following in time the new sampling time ti.

The interpolation 50 can for example be a linear interpolation.

In the presence of a first sample preceding (respectively following) in time the new sampling time ti and in the absence of a first sample following (respectively preceding) in time the new sampling time ti, for each sensor, the value of each piece of information at the time ti is obtained by copying 52 (respectively 51) the value of this information contained in the closest first sample preceding (respectively following) in time the new sampling time ti.

In FIG. 6A, one example of first date-stamped samples $d_{s1,t11}$, $d_{s1,t12}$, $d_{s1,t13}$ and $d_{s1,t14}$ respectively corresponding to the distance between the sensor 1 and the object whose movement it is desired to recognize, at the times t11, t12, t13 and t14 situated between tmin and tmax, is shown. The times t0 to t6 in this figure are the same new sampling times as those shown in FIG. 4.

As regards FIG. 6B, this shows one example of second date-stamped samples obtained by re-sampling of the signal delivered by the sensor 1 At the new sampling times t0 to t6, and whose value is calculated starting from first date-stamped samples $d_{s1,t11}$, $d_{s1,t12}$, $d_{s1,t13}$ and $d_{s1,t14}$ in FIG. 6A.

Thus, in this figure, the value $d_{s1,t0}$ of the distance at the time t0 for the sensor 1 is obtained by copying the value $d_{s1,t11}$ of the distance at the time t11 following t0 because there is no first sample before the time t0.

As regards the value $d_{s1,t1}$ of the distance at the time t1 for the sensor 1, this is obtained by linear interpolation between the value $d_{s1,t11}$ of the distance at the time t11 preceding t1 and the value $d_{s1,t12}$ of the distance at the time t12 following t1. Therefore:

$$d_{s1,t1} = \frac{t12-t1}{t12-t11} d_{s1,t11} + \frac{t1-t11}{t12-t11} d_{s1,t12}$$

The values $d_{s1,t2}$ of the distance at the time t2 are obtained in a similar manner from the values $d_{s1,t12}$ and $d_{s1,t13}$.

As regards the value $d_{s1,t3}$ of the distance at the time t3 and the value $d_{s1,t4}$ of the distance at the time t4, they are both obtained by linear interpolation between the value $d_{s1,t13}$ preceding t3 and the value $d_{s1,t14}$ following t4 because these samples are the two closest samples before and after both the instant t3 and the instant t4.

Finally, the values $d_{s1,t5}$ of the distance at the time t5 and $d_{s1,t6}$ of the distance at the time t6 are obtained by copying the value $d_{s1,t14}$ of the distance at the time t14 preceding t5 and t6 because there is no first sample after the time t5 and hence after the time t6.

In this example, only the information on distance of the sensor 1 is re-sampled. However, the re-sampling may be carried out for each sensor in a similar manner and, as indicated hereinbefore, if the signal delivered by each sensor contains several pieces of information relating to the movement detection, the re-sampling is carried out for each sensor and for each piece of information according to the same principle.

In one variant of the method, prior to the re-sampling step 32, for each sensor and for each piece of information, an additional first sample whose value is equal to the reference value is added at a preceding moment in time with a chosen duration δt, typically 20 milliseconds, the first sample containing the first value of this information that differs from the reference value. Similarly, a supplementary first sample is added at a following moment in time with this same chosen duration δt, the first sample containing the last value of this information that differs from the reference value.

This allows a second set of second date-stamped samples to be obtained with a more regular variation at the start and at the end of the movement.

Figure 7A:
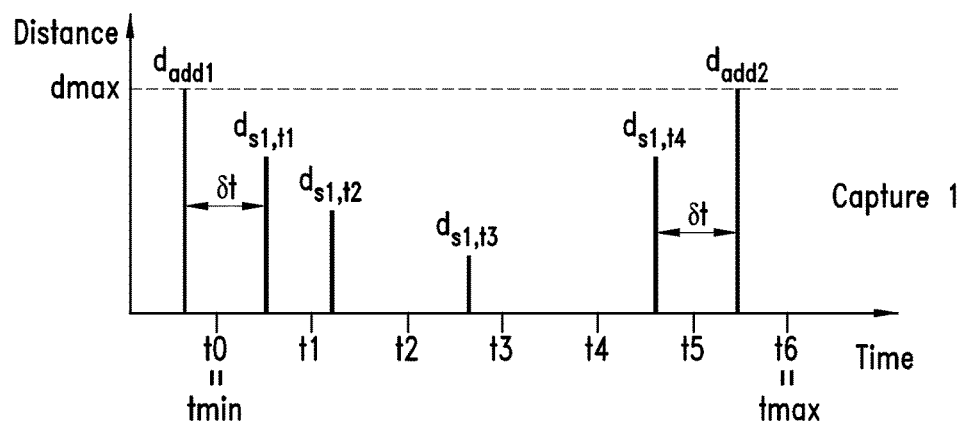
Figure 7B:
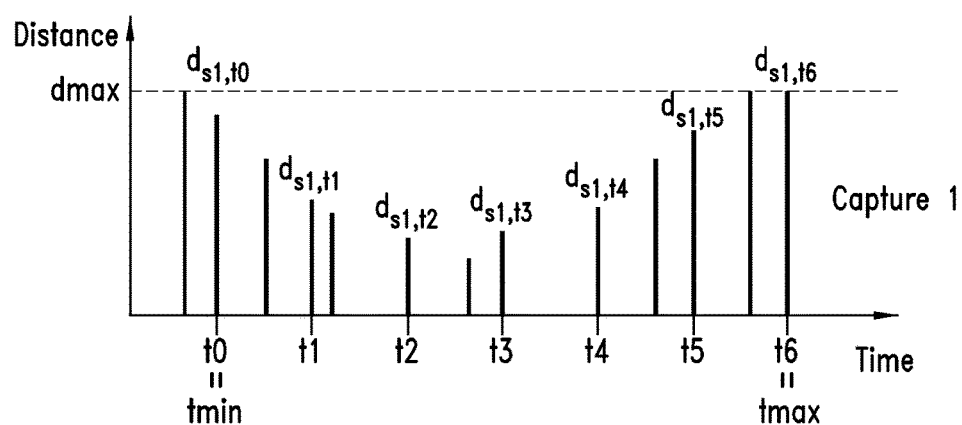

The addition of these two additional and supplementary samples, together with the re-sampling that respectively follows are illustrated in FIG. 7A and in FIG. 7B.

In FIG. 7A, the samples shown are the same as those in FIG. 6A with the exception of the additional samples $d_{add1}$ and of the supplementary sample $d_{add2}$ which have respectively been added before $d_{s1,t11}$ (which is the first sample whose value is different from the reference value dmax), and after $d_{s1,t14}$ (which is the last sample whose value is different from dmax). The period of time separating $d_{add1}$ from $d_{s1,t11}$ is the same as that which separates $d_{s1,t14}$ from $d_{add2}$, in other words δt, and the value of $d_{add1}$ and $d_{add2}$ is equal to dmax.

FIG. 7B shows the second date-stamped samples obtained by re-sampling of the signal delivered by the sensor 1 at the new sampling times t0 to t6 and whose value is calculated from the first date-stamped samples in FIG. 7A.

More precisely, the values of the samples $d_{s1,t11}$, $d_{s1,t2}$, $d_{s1,t3}$ and $d_{s1,t4}$ are obtained in exactly the same way as in the case of FIG. 6B. On the other hand, the value of $d_{s1,t0}$ is now obtained by linear interpolation between $d_{add1}$ and $d_{s1,t11}$ and no longer by copying the value of $d_{s1,t11}$. The value of $d_{s1,t5}$ is calculated in a similar manner from the values of $d_{s1,t14}$ and $d_{add2}$. Lastly, the value of $d_{s1,t6}$ is obtained by copying, just as in the case of FIG. 6B, but the value copied is, in the present case, that of $d_{add2}$ and not that of $d_{s1,t14}$.

By comparing the samples obtained in FIGS. 6B and 7B, it can be seen that the signal in FIG. 7B varies in a more regular manner at the start and at the end of the movement than that in FIG. 6B.

Once again, in this example, only the information on distance of the sensor 1 is re-sampled. However, the re-sampling may be carried out for each sensor in a similar manner.

Once the re-sampling of the signal has been delivered by each sensor carried out for each piece of information, by concatenating in one and the same vector the information from all the sensors re-sampled at the new sampling times, a vector v of fixed size and equal to Ni*Nc*Nt is therefore obtained, where Ni is the number of pieces of information supplied by each sensor, Nc the number of sensors and Nt=N+1 the number of new sampling times, containing signals sampled at regular time intervals and synchronized across the sensors.

Figure 8:
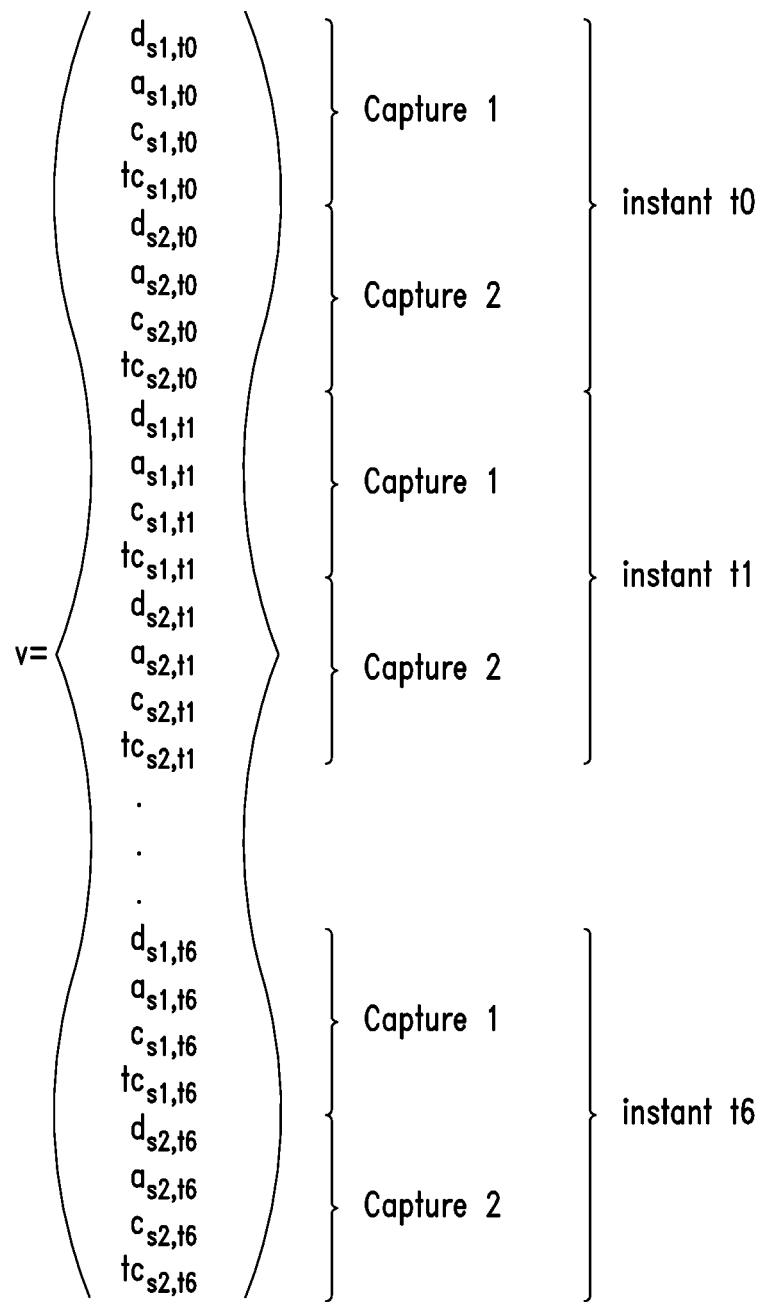
FIG. 8 illustrates a vector according to an embodiment.

On example of such a vector v is shown in FIG. 8. Here, this vector is composed of information on distance between the sensor and the object $d_{sn,ti}$, information on amplitude of the signal received by the sensor $a_{sn,ti}$, information on coverage of the object $c_{sn,ti}$ and information on convergence time of the sensor $tc_{sn,ti}$, for each sensor sn (n=1, 2) and for each new time ti (i=0, . . . , 6). For reasons of simplicity, the vector v of the FIG. 8 only contains the information for two sensors. However, if more sensors are used, the vector v is obtained in a similar manner. In this example, the vector v therefore comprises 4*2*7=56 components.

The vector v of fixed size containing signals sampled at regular time intervals and synchronized between the sensors thus obtained is, as indicated hereinbefore (FIG. 3), transmitted to the microprocessor 9 then processed by a simple shape-recognition algorithm such as the support vector machines, configured to accept at the input vectors of fixed size. It is this algorithm that will perform the recognition of movement of the object of interest.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   generating, using signal processing circuitry, a first set of time-stamped samples based on at least one signal from at least one proximity sensor;
   determining, using the signal processing circuitry, a movement-time interval based on the first set of time-stamped samples;
   determining, using the signal processing circuitry, a plurality of sampling times of the movement-time interval;
   generating, using the signal processing circuitry, a second set of time-stamped samples based on the determined plurality of sampling times and the first set of time-stamped samples;
   generating, using the signal processing circuitry, an indication of movement of an object based on the second set of time-stamped samples; and
   initiating, using the signal processing circuitry, one or more actions associated with the indication of movement of the object.

2. The method of claim 1 wherein the generating the indication of movement of the object comprises generating a vector of a fixed size based on the second set of time-stamped samples and applying a motion recognition algorithm using the fixed vector.

3. The method of claim 1 wherein the first set of time-stamped samples include movement information and generating a sample of the second set of time-stamped samples associated with a respective proximity sensor of the at least one proximity sensor includes generating movement information of the sample of the second set of time-stamped samples based on movement information of a sample of the first set of time-stamped samples associated with the respective proximity sensor and having a time-stamp closest in time to a sampling time of the sample of the second set of time-stamped samples.

4. The method of claim 1 wherein the first set of time-stamped samples include movement information and determining the movement-time interval based on the first set of time-stamped samples comprises:
   determining a start of the movement-time interval based on an earliest time-stamp of a sample of the first set of time-stamped samples having a value different from a reference value representative of non-detection of movement; and
   determining an end of the movement-time interval based on a time at which all of the samples of the first set of time-stamped samples have had a value equal to the reference value for a threshold time-period.

5. The method of claim 4 wherein the movement information comprises an indication of a distance separating the object from the at least one proximity sensor.

6. The method of claim 5 wherein the first set of time-stamped samples include additional information from the at least one proximity sensor.

7. The method of claim 1 wherein the at least one signal from at least one proximity sensor provides at least one of:
   an indication of a distance separating the object from the proximity sensor;
   an indication of an amplitude of a signal received by the proximity sensor;
   an indication of a coverage of the object; and
   a convergence time of the proximity sensor.

8. The method of claim 1 wherein at least one sample of the samples of the second set of time-stamped samples is generated by interpolating between:
   a value associated with a sample of the first set of time-stamped samples associated with a respective proximity sensor and having an earlier time-stamp value than a time-stamp value of the sample of the second set of time-stamped samples; and
   a value associated with a sample of the first set of time-stamped samples associated with the respective proximity sensor and having a later time-stamp value than the time-stamp value of the sample of the second set of time-stamped samples.

9. The method of claim 1 wherein generating a sample of the second set of time-stamped samples comprises associating a value associated with a closest sample of the first set of time-stamped samples and a respective proximity sensor with the sample of the second set of time-stamped samples.

10. The method of claim 1 wherein generating the second set of time-stamped samples comprises generating a sample associated with a respective Proximity sensor by interpolating between:
   a value associated with a sample of the first set of time-stamped samples associated with the respective proximity sensor and having a time-stamp value closest to a time-stamp value of the generated sample; and
   a reference value associated with a sample added to the first set of time-stamped samples, the sample added to the first set of time-stamped samples having a time-stamp value based on the time-stamp value of the generated sample and a reference time-difference value.

11. The method of claim 1 wherein the first set of time-stamped samples is generated based on a plurality of signals from a plurality of proximity sensors.

12. A device, comprising:
   at least one input configured to receive a first set of time-stamped samples indicative of movement of an object from at least one proximity sensor; and
   processing circuitry configured to:
      determine a movement-time interval based on the first set of time-stamped samples;
      determine a plurality of sampling times of the movement-time interval;
      generate a second set of time-stamped samples based on the determined plurality of sampling times and the first set of time-stamped samples;
      generate, based on the second set of time-stamped samples, a fixed-size vector indicative of movement of the object; and
      initiate one or more actions in response to the vector indicative of movement of the object.

13. The device of claim 12 wherein the processing circuitry comprises at least one processor configured to apply a motion recognition algorithm using the fixed-size vector.

14. The device of claim 12 wherein the processing circuitry is configured generate a sample of the second set of time-stamped samples associated with a respective proximity sensor by generating movement information of the sample of the second set of time-stamped samples based on movement information of a sample of the first set of time-stamped samples associated with the respective proximity sensor and having a time-stamp closest in time to a sampling time of the sample of the second set of time-stamped samples.

15. The device of claim 12 wherein the processing circuitry is configured to determine the movement-time interval by:
   determining a start of the movement-time interval based on an earliest time-stamp of a sample of the first set of time-stamped samples having a value different from a reference value representative of non-detection of movement; and
   determining an end of the movement-time interval based on a time at which all of the samples of the first set of time-stamped samples have had a value equal to the reference value for a threshold time-period.

16. The device of claim 12 wherein each sample of the first set of time-stamped samples includes at least one of:
   an indication of a distance separating the object from a proximity sensor;
   an indication of an amplitude of a signal received by the proximity sensor;
   an indication of a coverage of the object; and
   a convergence time of the proximity sensor.

17. The device of claim 12 wherein the processing circuitry is configured to generate at least one sample of the samples of the second set of time-stamped samples by interpolating between:
   a value associated with a sample of the first set of time-stamped samples having an earlier time-stamp value than a time-stamp value of the sample of the second set of time-stamped samples; and
   a value associated with a sample of the first set of time-stamped samples having a later time-stamp value than the time-stamp value of the sample of the second set of time-stamped samples.

18. The device of claim 12 wherein the first set of time-stamped samples are received from a plurality of proximity sensors and the processing circuitry is configured to generate at least one sample of the samples of the second set of time-stamped samples by interpolating between:
  a value associated with a sample of the first set of time-stamped samples associated with a first proximity sensor of the plurality of proximity sensors and having an earlier time-stamp value than a time-stamp value of the sample of the second set of time-stamped samples; and
  a value associated with a sample of the first set of time-stamped samples associated with the first proximity sensor of the plurality of proximity sensors and having a later time-stamp value than the time-stamp value of the sample of the second set of time-stamped samples.

19. The device of claim 18 wherein the processing circuitry is configured to generate at least one sample of the second set of time-stamped samples by associating a value associated with a closest sample of the first set of time-stamped samples and a respective proximity sensor of the plurality of proximity sensors with the sample of the second set of time-stamped samples.

20. The device of claim 18 wherein the processing circuitry is configured to generate at least one sample of the second set of time-stamped samples associated with a respective proximity sensor by interpolating between:
  a value associated with a sample of the first set of time-stamped samples associated with the respective proximity sensor and having a time-stamp value closest to a time-stamp value of the generated sample; and
  a reference value associated with a sample added to the first set of time-stamped samples, the sample added to the first set of time-stamped samples having a time-stamp value based on the time-stamp value of the generated sample and a reference time-difference value.

21. A system, comprising:
  a plurality of proximity sensors configured to generate a first set of time-stamped samples indicative of movement of an object; and
  processing circuitry configured to:
    determine a movement-time interval based on the first set of time-stamped samples;
    determine a plurality of sampling times of the movement-time interval;
    generate a second set of time-stamped samples based on the determined plurality of sampling times and the first set of time-stamped samples;
    generate, based on the second set of time-stamped samples, a fixed-size vector indicative of movement of the object; and
    initiate one or more actions in response to the vector indicative of movement of the object.

22. The system of claim 21 wherein the processing circuitry is configured to apply a motion recognition algorithm using the fixed-size vector.

23. The system of claim 21 wherein the processing circuitry is configured generate a sample of the second set of time-stamped samples associated with a respective proximity sensor by generating movement information of the sample of the second set of time-stamped samples based on movement information of a sample of the first set of time-stamped samples associated with the respective proximity sensor and having a time-stamp closest in time to a sampling time of the sample of the second set of time-stamped samples.

24. The system of claim 21 wherein the processing circuitry is configured to determine the movement-time interval by:
  determining a start of the movement-time interval based on an earliest time-stamp of a sample of the first set of time-stamped samples having a value different from a reference value representative of non-detection of movement; and
  determining an end of the movement-time interval based on a time at which all of the samples of the first set of time-stamped samples have had a value equal to the reference value for a threshold time-period.

25. The system of claim 21 wherein the plurality of proximity sensors are configured to generate time-stamped samples including at least one of:
  an indication of a distance separating the object from a respective proximity sensor;
  an indication of an amplitude of a signal received by the respective proximity sensor;
  an indication of a coverage of the object; and
  a convergence time of the respective proximity sensor.

26. The system of claim 21 wherein the processing circuitry is configured to generate at least one sample of the samples of the second set of time-stamped samples by interpolating between:
  a value associated with a sample of the first set of time-stamped samples having an earlier time-stamp value than a time-stamp value of the sample of the second set of time-stamped samples; and
  a value associated with a sample of the first set of time-stamped samples having a later time-stamp value than the time-stamp value of the sample of the second set of time-stamped samples.

27. The system of claim 21 wherein the processing circuitry is configured to generate at least one sample of the second set of time-stamped samples by associating a value associated with a closest sample of the first set of time-stamped samples and a respective proximity sensor of the plurality of proximity sensors with the sample of the second set of time-stamped samples.

28. A non-transitory computer-readable medium having contents which configure at least one processing device to perform a method, the method comprising:
  determining a movement-time interval based on a first set of time-stamped samples generated by a plurality of proximity sensors;
  determining a plurality of sampling times of the movement-time interval;
  generating a second set of time-stamped samples based on the determined plurality of sampling times and the first set of time-stamped samples;
  generating an indication of movement of an object based on the second set of time-stamped samples; and
  initiating, using the signal processing circuitry, one or more actions in response to the indication of movement of the object.

29. The medium of claim 28 wherein the method comprises generating a fixed-size vector based on the second set of time stamped samples and applying a motion recognition algorithm using the fixed-size vector.

30. The medium of claim 28 the method comprises generating at least one sample of the samples of the second set of time-stamped samples by interpolating between:

a value associated with a sample of the first set of time-stamped samples having an earlier time-stamp value than a time-stamp value of the sample of the second set of time-stamped samples; and a value associated with a sample of the first set of time-stamped samples having a later time-stamp value than the time-stamp value of the sample of the second set of time-stamped samples.

\* \* \* \* \*

UNITED STATES PATENT AND TRADEMARK OFFICE
CERTIFICATE OF CORRECTION

PATENT NO. : 10,072,923 B2  
APPLICATION NO. : 14/661907  
DATED : September 11, 2018  
INVENTOR(S) : Stéphane Valente Page 1 of 1

It is certified that error appears in the above-identified patent and that said Letters Patent is hereby corrected as shown below:

On the Title Page

Item (71) Applicant:
"STMicroelectronics SA, Montouge" should read, --STMicroelectronics SA, Montrouge--.

In the Claims

Column 13, Line 59 Claim 10:
"associated with a respective Proximity sensor by interpolating" should read, --associated with a respective proximity sensor by interpolating--.

Column 14, Line 29 Claim 14:
"circuitry is configured generate a sample of the second set of" should read, --circuitry is configured to generate a sample of the second set of--.

Signed and Sealed this
Ninth Day of July, 2019

Andrei Iancu
*Director of the United States Patent and Trademark Office*